Patented June 8, 1937

2,083,024

UNITED STATES PATENT OFFICE 2,083,024

ZIRCONIUM OPACIFYING PIGMENT AND METHOD OF MAKING

Charles J. Kinzie, John A. Plunkett, and Charles H. Commons, Jr., Niagara Falls, N. Y., assignors to The Titanium Alloy Manufacturing Company, New York, N. Y., a corporation of Maine No Drawing. Application June 6, 1934, Serial No. 729,232

13 Claims. (Cl. 106—36.2)

Our invention relates more particularly to improved methods of making new types of pigments containing zirconium compounds combined with other substances, which pigments are essentially non-metallic crystalline compounds or complexes that are exceptionally useful in the ceramic arts as opacifying agents as well as for other uses in which stable forms of pigments are desired.

Such novel zirconium pigments comprise new compositions of matter consisting of essentially crystalline substances in the form of composites bonded together with a relatively small amount of a glass matrix, which compositions or compounds contain one or more elements of the alkaline earth group combined with zirconium, aluminum and silicon compounds, for example, our improved opacifying and pigmenting material may comprise a combination of one element of the $R_2O_3$ group (aluminum oxide $Al_2O_3$), two elements of the $RO_2$ group (zirconium oxide $ZrO_2$ and silica $SiO_2$), with one or more elements of the RO group (ZnO, BaO, CaO, MgO, SrO).

During the course of extensive experiments made by us in the use of zirconium compounds as opacifiers, particularly zirconium oxides when used at the mill along with clay and milled with water to produce enamel slips which when applied and fired produce vitreous enamel coatings, we discovered that in some enamel formulations the zirconium oxide tended to dissolve during the firing of the ware and to lose its opacifying effect to a considerable extent.

As the result of much detailed experimental work we have discovered that composite zirconium opacifiers may be made which will stand the fire in the enamel without any appreciable loss of opacity.

In order that the nature of our discoveries may be understood by those skilled in this art, a series of illustrative examples will now be set forth to show how our improved methods may be successfully practiced to obtain such new composite zirconium opacifiers.

*Example A.*—The charge is made consisting of the following materials, parts by weight:

| | Parts |
|---|---|
| Aluminum hydrate | 295 |
| Zinc oxide | 200 |
| Zirconium silicate | 616 |
| | 1,111 |

The materials are charged to a ball mill, and wet milled with water to a state finer than 300 mesh, discharged and then dried.

The mix is then heated to about 2500° F. to effect a decomposition of the $ZrSiO_4$ and to combine it with the other ingredients in to a stable complex silicate. The resulting charge is crushed and then finely milled, preferably in a wet ball mill to a fineness preferably within the range of 0.3 micron to 20 microns, or an average of 1 to 3 microns.

In case pure $ZrSiO_4$ was used along with other pure materials, the product after milling may simply be dried, but generally it is best to extract the milled material before drying with about 100 c. c.—35% hydrochloric acid added to the above charge. This treatment serves to remove small amounts of such elements as iron, manganese, copper, etc., so as to leave a residue upon washing and drying which is brilliantly white.

The product obtained is of the following approximate calculated oxide percentage composition:

| | Percent |
|---|---|
| ZnO | 20.00 |
| $Al_2O_3$ | 19.28 |
| $SiO_2$ | 20.72 |
| $ZrO_2$ | 40.00 |
| | 100.00 |

We have found by microscopic examination that this material consists essentially of a crystalline substance bonded by a relatively small amount of glassy matrix. The crystals are too fine to be definitely identified in the usual petrographic manner. By reheating a small part of the mass a number of times, we succeeded in growing the crystals somewhat. We found that the optical properties of this crystalline substance did not correspond to those of any known crystal for which we could find published information. The crystals are biaxial with positive elongation. The indices are higher than those of zircon but not quite as high as those given for zirconia. The crystals grow in radiated clusters with the long axes inclined at about 7 to 8 degrees from the adjacent crystal. No crystals were grown large enough to determine their sign or to measure the value of "2E" or to determine the crystal angle with any degree of accuracy.

The composition of these crystals is not known, but we believe they are a compound of zinc-alumina-zirconia and some silica with the glass probably containing most, if not all, of the silica along with a little of the other constituents. Because of the inability to segregate the crystals from the glass and to determine their exact composition, we have called this crystal "Opacifier A" until we are able to learn more about it. However, the identification of this crystal is not material for the purpose of our invention. The important feature is that the crystal does form, and, as such, is probably responsible for the resultant value of this product as an opacifier. The crystal is apparently more stable in contact with enamel melts, and therefore results in more stable opacity on longer firing than is obtainable with zirconium oxide. That this is a fact is shown by the following example of its use as an opacifier in an enamel.

Using an enamel frit which has practically no opacity, the following mill mixtures were prepared.

| Mill No. | Frit | Enameling clay | MgCO$_3$ | Zirconium oxide | Opacifier A | Water |
|---|---|---|---|---|---|---|
| 1 | 100 | 6 | ¼ | 6 | 0 | 38 |
| 2 | 100 | 6 | ¼ | 3 | 3 | 38 |
| 3 | 100 | 6 | ¼ | 0 | 6 | 38 |
| 4 | 100 | 6 | ¼ | 0 | 10 | 39 |

All these mixtures were ground to practically the same fineness as represented by a residue of 9 to 11 grams on a 200 mesh screen from 100 ccs. of samples.

Two specimen pieces of each milling were prepared by spraying two coats of the white enamel over a 6″ by 4″ metal piece ground coated in the usual manner. Both pieces were burned in an electric enameling furnace at 1500° F. for each coat. One piece was fired for 2¼ minutes, while the other piece was fired for 3½ minutes. Care was taken to apply the enamel uniformly and in the same amount on all pieces.

After firing the pieces, they were carefully examined to determine the quality, texture, color, opacity, etc. The results showed that the "Opacifier A" was very apparently more stable than the zirconium oxide alone as evidenced by the lesser difference between the short and long fired piece in the set containing "Opacifier A" than was shown in the set containing zirconium oxide. There was not quite as much opacity evidenced by the "Opacifier A" in the short fire as was shown by zirconium oxide when the same amount of opacifier was used in both cases, but the difference between the two firings was less pronounced.

When ten parts of "Opacifier A" were used instead of six parts of zirconium oxide, there was appreciably more opacity produced which was apparently as stable as the 6 parts of "Opacifier A". A mixture of "Opacifier A" and zirconium oxide appears to possess most of the stability under fire as does the "Opacifier A" alone, and at the same time produces a denser opacity than 6 parts of either component alone.

The values given below represent the opacity readings on the several samples as determined by the Bausch & Lomb opacimeter.

| Mill No. | Time of firing | Opacity reading | Difference | Difference in percent |
|---|---|---|---|---|
| | Minutes | | | |
| 1 | 2¼ | 64.0 | 4.0 | 6.25 |
| 1 | 3½ | 60.0 | | |
| 2 | 2¼ | 66.5 | 2.0 | 3.01 |
| 2 | 3½ | 64.5 | | |
| 3 | 2¼ | 59.0 | 1.0 | 1.70 |
| 3 | 3½ | 58.0 | | |
| 4 | 2¼ | 67.0 | 1.0 | 1.49 |
| 4 | 3½ | 66.0 | | |

Thus it can be readily seen that there is a distinct improvement in this opacifier over zirconium oxide in respect to stability in firing.

The stability has been demonstrated in other types of enamel frits, but only one example seems necessary.

*Example B.*—This is an example similar to Example A but in Example B a different mixture is used and a different crystal is formed. The process and results are similar to those in Example A.

The mixture in this case is composed of the following materials in this proportion:

| | Parts by weight |
|---|---|
| Aluminum hydrate | 22.91 |
| Zinc oxide | 19.73 |
| Barium carbonate | 25.39 |
| Zirconium silicate | 46.51 |
| Raw total | 114.54 |
| Melted | 100.00 |

The theoretical composition of reacted product in calculated oxide percentages will be

| | Percent |
|---|---|
| BaO | 19.73 |
| ZnO | 19.73 |
| Al$_2$O$_3$ | 15.00 |
| SiO$_2$ | 15.54 |
| ZrO$_2$ | 30.00 |
| | 100.00 |

The mixture is mixed, heat reacted, crushed, milled, etc., and generally prepared as an opacifier substantially in the same way as for Example A with the exception that about 150° F. less heat is required to react this material than in Example A. In no case is the temperature specified a critical one, as temperatures within considerable range may be used. The only requirements are that sufficient time be given at any given temperature to complete the reaction. The temperatures specified were those at which the reaction proceeded rapidly enough to insure completion in two hours at the temperature used. The reaction should be finished before this time in order to allow for a factor of safety. If a shorter time is desired, the temperature should be increased.

The crystals in this case resemble those of "Opacifier A" but are somewhat lower in refractive index and appreciably lower in birefringence. They are too small to determine other properties accurately.

When used as an opacifier in the same manner as for "Opacifier A" this "Opacifier B" has the same general properties as "A" though it is not quite as good an opacifying agent in enamels.

*Example C.*—This example is similar to Examples A and B in regard to the process for making the improved zirconium pigment. The following mixture is first made up, parts by weight:

| | Parts |
|---|---|
| Aluminum hydrate | 22.91 |
| Zinc oxide | 19.73 |
| Calcium carbonate | 35.17 |
| Zirconium silicate | 46.51 |
| Raw | 124.32 |
| Reacted | 100.00 |

The composition will have approximately the following oxide percentages:

| | Percent |
|---|---|
| CaO | 19.73 |
| ZnO | 19.73 |
| $Al_2O_3$ | 15.00 |
| $SiO_2$ | 15.54 |
| $ZrO_2$ | 30.00 |
| | 100.00 |

The mixture is finely milled, mixed, reacted, crushed, milled, and generally prepared as an opacifier as described in Example A. As to the crystals produced, very little difference could be detected between them and those in "Opacifier B". Apparently they form an isomorphous series. When used as an opacifier, there was little to choose from between the action of these crystals and those of Example B.

*Example D.*—In this Example the following mixture is first made up, parts by weight:

| | Parts |
|---|---|
| Aluminum hydrate | 30.59 |
| Zinc oxide | 12.50 |
| Calcium carbonate | 22.28 |
| Barium carbonate | 2.41 |
| Zirconium silicate | 53.35 |
| Raw | 121.63 |
| Reacted | 100.00 |

The composition will have approximately the following oxide percentages:—

| | Percent |
|---|---|
| CaO | 12.50 |
| BaO | 1.87 |
| ZnO | 12.50 |
| $Al_2O_3$ | 20.00 |
| $SiO_2$ | 18.13 |
| $ZrO_2$ | 35.00 |
| | 100.00 |

This product was made in the same manner as described in the previous examples. The resulting opacifier is similar in its effects to those of Examples B and C.

*Example E.*—The mix for this product comprised the following ingredients, parts by weight:

| | Parts |
|---|---|
| Aluminum hydrate | 21.83 |
| Zinc oxide | 25.00 |
| Zirconium silicate | 61.54 |
| Raw | 108.37 |
| Reacted | 100.00 |

The approximate analysis of the product in calculated oxide percentages was as follows:

| | Percent |
|---|---|
| ZnO | 25.00 |
| $Al_2O_3$ | 14.28 |
| $SiO_2$ | 20.72 |
| $ZrO_2$ | 40.00 |
| | 100.00 |

This product was prepared in the same manner as for the product in Example A, and needs approximately the same temperature for complete reaction. Microscopic examination shows the crystal structure to be the same as "Opacifier A" but that the product as a whole has a somewhat greater percentage of glass. When prepared to an opacifier and used as shown in Example A, the results are about the same though the opacity of the product is very slightly less than that of Example A.

*Example F.*—The mix for this product comprised the following ingredients, parts by weight:

| | Parts |
|---|---|
| Aluminum hydrate | 37.13 |
| Zinc oxide | 15.00 |
| Zirconium silicate | 61.54 |
| Raw | 113.67 |
| Reacted | 100.00 |

The approximate analysis of the product in calculated oxide percentages was as follows:

| | Percent |
|---|---|
| ZnO | 15.00 |
| $Al_2O_3$ | 24.28 |
| $SiO_2$ | 20.72 |
| $ZrO_2$ | 40.00 |
| | 100.00 |

This product was prepared in the same manner as in Example A and needs about the same temperature to bring it to completion. The microscopic examination of this Example F product shows that in addition to the crystal "Opacifier A" there is a small percentage of mullite or $3Al_2O_3.2SiO_2$ ($Al_6Si_2O_{13}$) crystals growing in the glass. When treated as described under Example A and prepared into an opacifier, it is essentially the same in its effect as the product of Example E.

Through numerous additional experiments we have also determined the effects of varying the contents of the various ingredients such as $Na_2O$, MgO, CaO, BaO, ZnO, $Al_2O_3$, $SiO_2$, $ZrO_2$ etc. The general conclusions we discovered were that—

1. Alkalies are detrimental.
2. It is better not to add any more $SiO_2$ than is introduced by the zirconium silicate.
3. The higher the $ZrO_2$ content within limits of practical working the more opacity was developed. About 40% $ZrO_2$ was decided as preferable considering the reaction temperature, opacity derived, cost, etc.
4. With $ZrO_2$ at about 40%, the $Al_2O_3$ should be about 20% for maximum effectiveness.
5. The alkaline earths all are effective in producing a crystalline material in combination with $ZrO_2$, $SiO_2$, and $Al_2O_3$ which will produce stable opacity.

However, we prefer to use either zinc oxide or combinations of zinc oxide with others of this series rather than using CaO, MgO, BaO, etc. in combination with $Al_2O_3$ and $ZrO_2$ and $SiO_2$, but without ZnO. The reason we prefer this is because of the somewhat greater opacity of the zinc compounds and not because they are any more stable.

All of these zirconium pigment compounds which we have described can be used to good advantage in opacifying glazes as well as enamels.

The following Example G is a case where "Opacifier A" is introduced into a glaze composition.

Example G

Fritted portion

| | Parts by weight |
|---|---|
| Borax | 13.66 |
| Flint | 20.00 |
| Sodium carbonate | 8.15 |
| Barium carbonate | 6.44 |
| Raw total | 48.25 |
| Melted | 37.00 |

Mill mix for glaze

| | |
|---|---|
| Fritted portion | 37.00 |
| "Opacifier A" | 30.00 |
| Fat clay | 7.32 |
| Flint | 12.42 |
| Whiting | 7.15 |
| Zircon | 10.77 |
| Water about | 45.00 |
| | 149.66 |

This mill mix is then milled until practically all will pass a 325 mesh screen, and is then applied by spraying or dipping to either green or bisqueted ware, and fired to 2000° F. to 2380° F. The theoretical composition of the finished glaze will be in calculated oxide percentages as follows:

| | Percent |
|---|---|
| $Na_2O$ | 7.00 |
| CaO | 4.00 |
| BaO | 5.00 |
| ZnO | 6.00 |
| $B_2O_3$ | 5.00 |
| $Al_2O_3$ | 8.00 |
| $SiO_2$ | 46.00 |
| $ZrO_2$ | 19.00 |
| | 100.00 |

It is not necessary to make the products from the raw materials shown under the various examples, for as long as the final composition is the same the product will be the same. For instance, the following three cases show various methods of compounding "Opacifier A", and in all cases the finished product should be the same, though in some cases it may be found necessary to vary the temperatures somewhat in order to make the reaction proceed satisfactorily.

Case A—1

*Adding $ZrO_2$ as pure zirconium oxide*

| | Parts by weight |
|---|---|
| Zinc oxide | 20.0 |
| Aluminum hydrate | 29.5 |
| Powdered silica | 20.72 |
| Pure $ZrO_2$ | 40.00 |
| Raw | 110.22 |
| Reacted | 100.00 |

Case A—2

*Adding $ZrO_2$ as pure zirconium oxide and the $SiO_2$ and part of the $Al_2O_3$ as clay*

| | Parts by weight |
|---|---|
| Zinc oxide | 20.00 |
| Clay | 46.63 |
| Aluminum hydrate | 10.66 |
| Pure $ZrO_2$ | 40.00 |
| Raw | 117.29 |
| Reacted | 100.00 |

In this case the clay used had approximately the following analysis:

| | Percent |
|---|---|
| $SiO_2$ | 51.00 |
| $Al_2O_3$ | 30.31 |
| Loss and impurities | 18.69 |
| | 100.00 |

Case A—3

In this case the $ZrO_2$ is added in the form of an ore varying in composition, but in this case containing 83.5% $ZrO_2$ plus impurities and 16.0% $SiO_2$ and is a mixture probably of baddeleyite and zircon.

| | Parts by weight |
|---|---|
| Zinc oxide | 20.00 |
| Aluminum hydrate | 17.61 |
| Clay | 25.61 |
| Ore | 47.90 |
| Raw | 111.12 |
| Reacted | 100.00 |

In all three cases the batches must be treated as described in Example A with the exception of minor variations in temperature.

We may also incorporate coloring agents into any of these compositions so as to produce coloring as well as opacifying agents varying from any tint to any shade of color. For instance, if ⅛ part of cobalt oxide (CoO) is mixed with 111.1 parts of raw mix for the product of "Example A", and then the mix is treated in the usual way, an opacifying and coloring agent will be produced, which, if added to an enamel frit as shown in "Example A" will produce a color which is more or less correctly described as "sky blue".

Lesser amounts of cobalt oxide in the raw mix will produce lighter tints of blue, while greater additions will produce varying blue colors down to very deep blue. By choosing the coloring agents, practically any desired color may be obtained. Although the making of colors has been known for a long time, we believe the compounding of such colors along with a stable base such as shown is new and will result in more stable colors in the finished product. It has long been desired so to combine the coloring ingredient with a stable base, but this combination has not been very successful up to the present time.

The compounds which we have described might be classified as combinations of one or more elements of Group II with one (or more) of the elements of Group III with two or more of the elements of Group IV of the Periodic system. For instance, it should be possible to use boric oxide along with or in place of some of alumina. However, as we have set forth, the use of too much $B_2O_3$ tends to reduce the resulting opacity.

It is also quite possible to substitute any one or mixtures of the following: titanium oxide, germanium oxide, tin oxide, cerium oxide, hafnium oxide, thorium oxide, in place of all of or part of either silica or zirconium oxide. At the present time this is not considered economically feasible due to the cost of the substituting materials.

We claim as our invention:—

1. The method of making a composite opacifying pigment consisting of a stable, readily-powdered, crystalline complex silicate containing zirconium oxide from 30% to 40%, which comprises heating a charge composed preponderatingly of zirconium silicate, lesser amounts of a compound of one element of the $R_2O_3$ group, two elements of the RO₂ group, one of which is zirconium oxide ranging from 30–40%, and a compound of at least one element of the RO group to substantially mutual decomposition and chemical reaction of the constituents of the charge to form a stable and readily pulverizable non-metallic crystalline complex silicate bonded with a glass matrix, and milling the resulting product.

2. The method of making a composite opacifying pigment consisting of a stable, readily-powdered, crystalline complex silicate containing zirconium oxide from 30% to 40%, which comprises heating a charge composed of zirconium silicate, a compound of one element of the R₂O₃ group, two elements of the RO₂ group, one of which is zirconium oxide ranging from 30–40%, and a compound of one element of the RO group to substantially mutual decomposition and chemical reaction of the constituents of the charge to form a stable and readily pulverizable non-metallic crystalline complex silicate bonded with a glass matrix, treating the roasted mass with hydrochloric acid to remove impurities, and milling the resulting product.

3. In the method of making a composite opacifying pigment consisting of a stable, readily-powdered, crystalline complex silicate containing zirconium oxide from 30% to 40%, the step which consists in heating a finely-divided charge composed preponderatingly of zirconium silicate, lesser amounts of a compound of one element in the R₂O₃ group, two elements of the RO₂ group, one of which is zirconium oxide ranging from 30–40%, and a compound of at least one element of the RO group to substantially mutual decomposition and chemical reaction of the constituents of the charge to form a stable and readily pulverizable non-metallic crystalline complex silicate bonded with a glass matrix.

4. In the method of making a composite opacifying pigment consisting of a stable, readily-powdered, crystalline complex silicate containing zirconium oxide from 30% to 40%, the step which consists in heating a finely-divided charge composed preponderatingly of zirconium silicate, lesser amounts of aluminum hydrate and zinc oxide to substantially mutual decomposition and chemical reaction of the constituents of the charge to form a stable and readily pulverizable non-metallic crystalline complex silicate bonded with a glass matrix.

5. In the method of making a composite opacifying pigment consisting of a stable, readily-powdered, crystalline complex silicate containing zirconium oxide from 30% to 40%, the step which consists in heating a finely-divided charge composed preponderatingly of zirconium silicate, lesser amounts of aluminum hydrate, barium carbonate and zinc oxide to substantially mutual decomposition and chemical reaction of the constituents of the charge to form a stable and readily pulverizable non-metallic crystalline complex silicate bonded with a glass matrix.

6. In the method of making a composite opacifying pigment consisting of a stable, readily-powdered, crystalline complex silicate containing zirconium oxide from 30% to 40%, the step which consists in heating a finely-divided charge composed preponderatingly of zirconium silicate, lesser amounts of aluminum hydrate, calcium carbonate and zinc oxide to substantially mutual decomposition and chemical reaction of the constituents of the charge to form a stable and readily pulverizable non-metallic crystalline complex silicate bonded with a glass matrix.

7. As a new article, a stable and readily pulverizable non-metallic crystalline complex silicate containing at least one element of the alkaline earth-metal group combined with oxides of zirconium, aluminum and silicon, the zirconium oxide content ranging from 30% to 40%, all being bonded with a glass matrix.

8. A composite opacifying pigment consisting of a crystalline vitreous mass composed of one element of the R₂O₃ group, two elements of the RO₂ group one of which is zirconium oxide ranging from 30 to 40%, and at least one element of the RO group combined as a stable complex silicate bonded with a glass matrix.

9. A composite colored opacifying pigment consisting of a crystalline vitreous mass composed of one element of the R₂O₃ group, two elements of the RO₂ group one of which is zirconium oxide ranging from 30% to 40%, and at least one element of the RO group and a coloring material, all combined as a stable complex silicate bonded with a glass matrix.

10. A composite opacifying pigment consisting of a readily-powdered, non-metallic, crystalline vitreous mass consisting of a complex silicate bonded with a glass matrix composed of elements calculated in oxide percentages approximately as follows: zinc oxide 12–25%; aluminum oxide 15–25%; silicate 15–21%; and zirconium oxide 30–40%.

11. A composite opacifying pigment consisting of a readily-powdered, non-metallic, crystalline vitreous mass consisting of a complex silicate bonded with a glass matrix composed of elements calculated in oxide percentages approximately as follows: zinc oxide about 20%; aluminum oxide about 20%; silica about 20%; and zirconium oxide about 40%.

12. An opaque enamel or glaze comprising in addition to the enamel or glaze forming ingredients as the material producing opacity a roasted product consisting of a stable complex silicate composed preponderatingly of zinc, alumina and zirconia, the zirconia content ranging from 30% to 40%, all chemically combined with some silica and characterized as being a non-metallic crystalline substance bonded by a relatively small amount of glassy matrix and having a refractive index value lower than zirconia.

13. A colored opaque enamel or glaze comprising in addition to the enamel or glaze forming ingredients as the material producing opacity a roasted product consisting of a stable complex silicate composed preponderatingly of zinc, alumina and zirconia, the zirconia content ranging from 30% to 40%, all chemically combined with some silica and a coloring agent fixed in said stable base, and characterized as being a non-metallic crystalline substance bonded by a relatively small amount of glassy matrix and having a refractive index value lower than zirconia.

CHARLES J. KINZIE.
JOHN A. PLUNKETT.
CHARLES H. COMMONS, Jr.